(No Model.) 6 Sheets—Sheet 2.

W. F. GARDNER.
TIME CONTROLLING SYSTEM.

No. 287,015. Patented Oct. 23, 1883.

(No Model.) 6 Sheets—Sheet 3.

W. F. GARDNER.
TIME CONTROLLING SYSTEM.

No. 287,015. Patented Oct. 23, 1883.

Attest;
F. W. Howard
F. T. Chapman

Wm. F. Gardner
Inventor;
by
J. H. MacDonald
Atty.

(No Model.) 6 Sheets—Sheet 4.

W. F. GARDNER.
TIME CONTROLLING SYSTEM.

No. 287,015. Patented Oct. 23, 1883.

Attest:
F. W. Howard
F. T. Chapman

Inventor:
Wm. F. Gardner
By J. H. MacDonald
Atty.

(No Model.) 6 Sheets—Sheet 5.

W. F. GARDNER.
TIME CONTROLLING SYSTEM.

No. 287,015. Patented Oct. 23, 1883.

Attest:
F. W. Howard
F. T. Chapman

Wm. F. Gardner
Inventor;
by
J. H. MacDonald
Atty.

UNITED STATES PATENT OFFICE.

WILLIAM F. GARDNER, OF BALTIMORE, MARYLAND.

TIME-CONTROLLING SYSTEM.

SPECIFICATION forming part of Letters Patent No. 287,015, dated October 23, 1883.

Application filed August 22, 1883. (No model.)

*To all whom it may concern:*

Be it known that I, WILLIAM F. GARDNER, a citizen of the United States, residing at Baltimore, in the county of Baltimore and State of Maryland, have invented certain new and useful Improvements in Time-Controlling Systems, of which the following is a specification, reference being had therein to the accompanying drawings.

My invention relates to a system for automatically controlling clocks and sending time-signals.

The object of my invention is the correction of clocks to their true time—local or other—as may be desired, by signals from an observatory.

It consists in a standard mean-time clock, a primary, transmitting, or control clock, a series of secondary controlled clocks and controlling-clocks, and a series of controlled local clocks, the transmitting-clock containing means for sending preliminary signals, and mechanism for controlling the system of clocks.

It further consists of a system for transmitting time-signals and setting to correct local time-clocks on different meridians from a standard clock whose daily error is determined by astronomical observation. It embodies such standard clock, a signal-transmitting clock independently actuated, a chronograph for comparing the standard and transmitting clocks, circuit opening or closing devices, in connection with the transmitting-clock, for giving preparatory signals and for actuating synchronizing devices on the secondary clocks in electric circuit, and having devices whereby the hands may be set to noon or correct local time by the proper signal from the transmitter, and a series of local clocks similarly connected in circuit with the secondary clocks, so as to be set thereby to their proper local time through the signals from the primary transmitter.

It further consists in certain mechanism and details which will be fully set forth in the specification, and pointed out in the accompanying drawings, in which—

Figure 1ª represents a standard mean-time clock, a chronograph, and a transmitting and control clock in observatory-circuits.

My system of sending time-signals and controlling clocks begins with a standard mean-time clock, whose error is determined daily—such as the standard-time clocks at the United States Naval Observatory, Greenwich, Paris, &c. The standard clock is in a local circuit, with a chronograph electrically connected with a transmitting-clock, as shown in Fig. 1ª.

Heretofore the transmission of time-signals has been accompanied by many errors, arising from defects in the mechanism and system. Cities, railways, steamship-lines, factories, and large commercial establishments want and require a standard time system. Many ways have been devised for this purpose. Electric, pneumatic, and other clocks or time-indicators, having both pneumatic and electric movements have been tried. These are what are known as "dead" clocks—that is, clocks actuated by currents only, having no maintaining power within themselves. Moreover, in the use of all such devices, and other time-setting systems, there has been no means of starting from daily corrected time. As there is a daily error in the standard time, it must be corrected daily, otherwise an increment of error is carried on until the system of control is valueless for the purpose indicated. Pneumatic clocks are local in their nature and could not be used on long lines. Electric clocks are liable to get out of order with the line. Suppose the line to be down several days, the electric clocks are stopped and time is not indicated. In my system, no matter whether the line is down or not, the time continues as the clocks are not dead clocks, but have within themselves a train independent of the control. Again, by means of my system, railway trunk-lines, &c., have the direct means of simultaneously controlling all the clocks in their system by the one general signal, each station-clock being set daily to its local, section, or other time. To attain this, I have provided mechanism as follows:

The seconds-beats of the standard clock O', Fig. 1ª, are transmitted to a chronograph, Q', as are also those of the transmitting control-clock M', by which the two clocks are compared, and the pendulum of the control-clock accelerated or retarded by hand, direct, and reverse currents, friction, or any other of the well-known means for correcting, until it indicates correct time. This will be shown by the difference between the beats of the two clocks as recorded on the chronograph. The error of the standard observatory-clock being known, the difference between the two clocks is made the same as this error, and is measured on the barrel of the chronograph by a micrometer-scale. The control-clock movement consists of the ordinary dead beat or gravity escapement.

Figures 11, 12, 13:
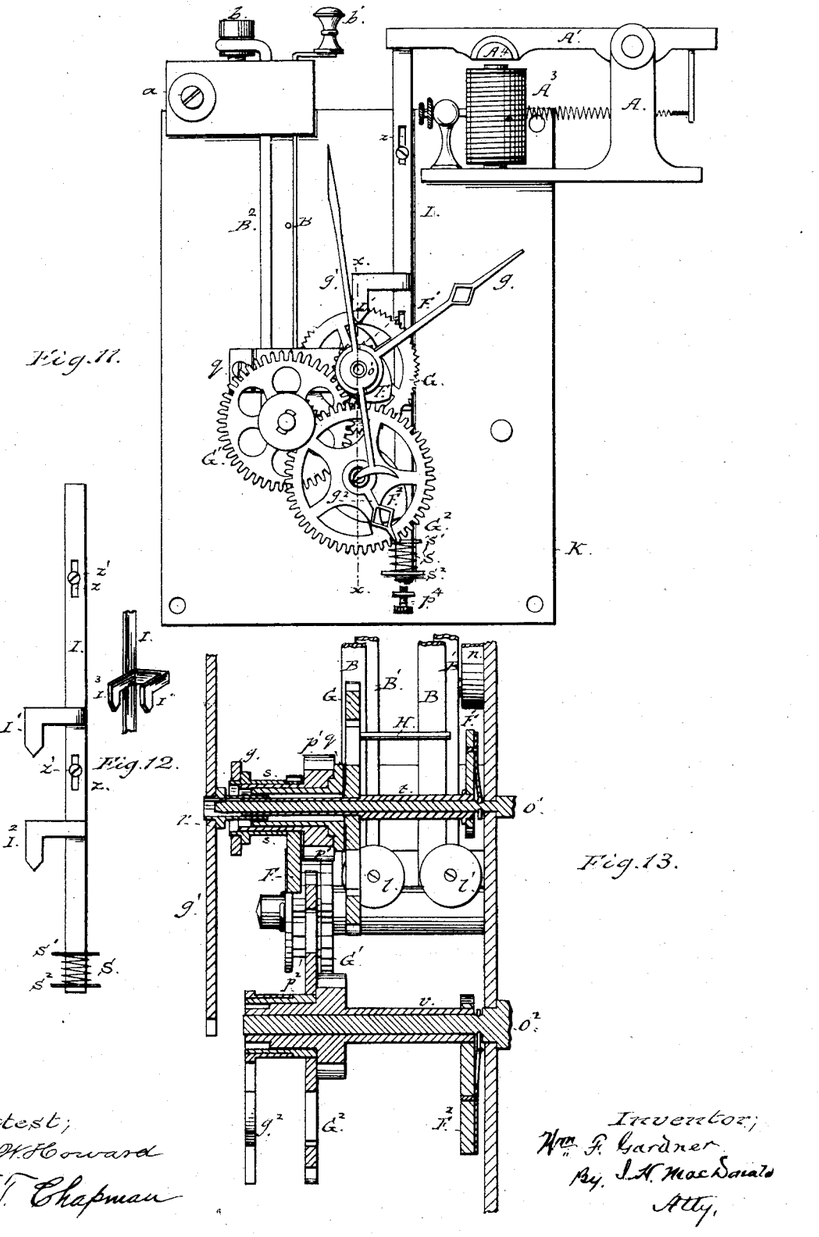
Fig. 11, an elevation of a modified form of dial, train, and cam-actuating mechanism for a setting device.
Fig. 12, a detail view of the cam-actuating lever.
Fig. 13, a section on line $x\,x$, Fig. 11.

The seconds-hand of the secondary controlling-clock $g'$, Fig. 11, is mounted on a sleeve passing over arbor $o'$, the minute-hand $g$ being on the sleeve of the cannon-pinion, actuated by the dial-train G' G², in the ordinary way. The hour-hand $g^2$, is mounted on a similar pinion on arbor $o^2$, Fig. 13. Two cams, F F', are rigidly mounted on two sleeves, $t$ and $s$, on the arbor $o'$, Fig. 11, and a third cam, F², is mounted in the same way on the arbor $o^2$. The hands have independent motions in the ordinary manner upon the arbors, but the cams, being fixed to the sleeves on which the pinions move, control the movement of the hands. I may, however, mount the seconds, minute, and hour hands on one arbor, as indicated in N', Fig. 1ª, or control the hour-hand by gearing. These pinion-sleeves carry the cams, also the hands, the latter being carried by friction in the ordinary manner. The cams must be centered so that the points of the lever will bear on all their centers at the same time, and held in this position while the hands are adjusted to indicate the time, local or otherwise, to which they are to be set by the one general signal, thus enabling me to set a whole series of clocks, at the same time, to as many different times as may be desired. That is to say, the cams are adjusted to a point or a center that, upon being controlled, will give the local time of the place or of other points, as desired, the hands being set to read the difference in time, whatever it may be. For example, a controlled clock in New York energizing the magnets in controlled clocks in Philadelphia and intermediate stations, causes the true local time to be indicated simultaneously at all these points in that circuit of the controlled clock. The difference in time between the control and controlled stations being known, I am enabled to set the hands of the clock to the local time of the place or stations. This having been done, I am enabled, by means of the cams, to bring back the hands daily or hourly to their true local-time point.

Figure 2:
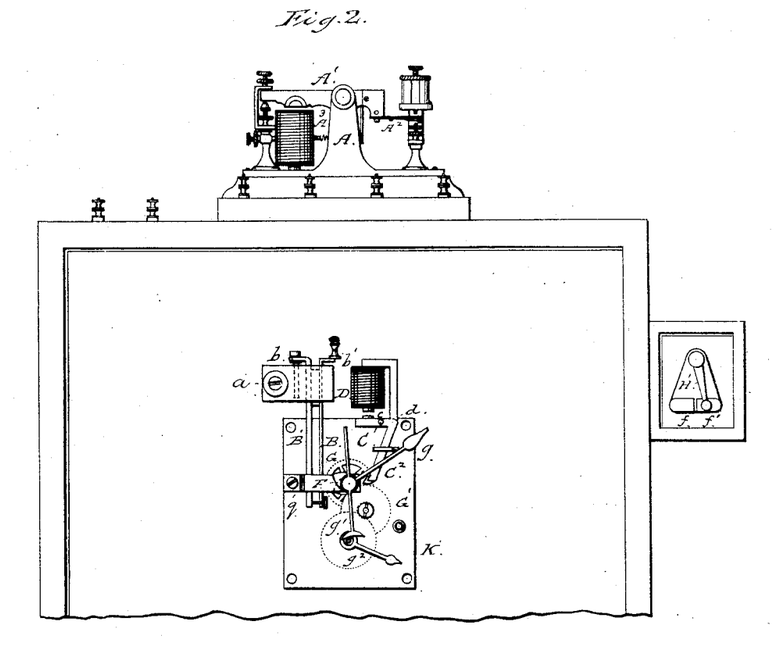
Fig. 2, a side elevation of the repeater, the time-signaling mechanism, and the means for automatically setting the seconds, minute, and hour hands of the control-clock to a zero-point.
Figure 3:
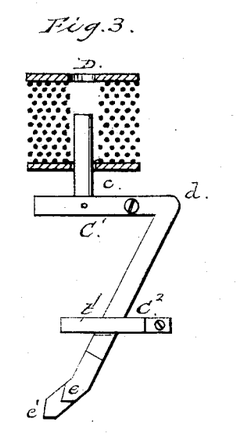
Fig. 3, a section of an axial magnet and the cam-actuating lever, having secured therewith an armature-core.
Figure 4:
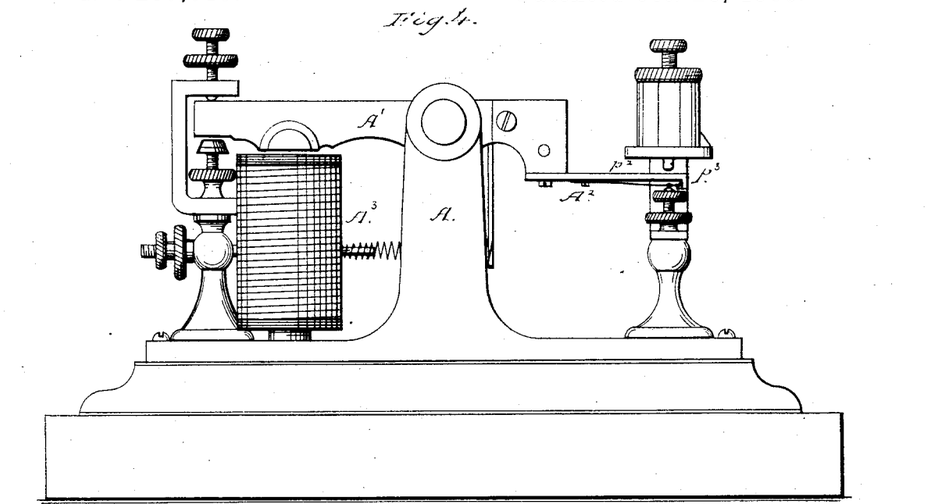
Fig. 4, a side elevation of the signal-repeater.

The magnet D, Fig. 2, of the secondary controlling-clock is energized by the current from an observatory transmitting-clock in the main line, and attracts the armature $c$ on a balanced armature-lever, C, pivoted to plate K at $d$. This lever consists of two arms, $c'$ $c^2$, the former having the armature $c$ and the latter the push-points $e$ $e'$, which act upon the cams F F' on the seconds and minute hand sleeves. These points striking the cams at any point on their periphery cause them to turn with the arbors or sleeves until the points enter notches in the cams. This action carries the hour, minute, and seconds hands and sets them to the time for which they have been adjusted.

I will now proceed to describe the devices employed in the transmitting and in the secondary control-clock to transmit time-signals to the clocks receiving control from them, respectively. I describe them particularly in connection with the primary transmitter.

A wheel, G, of the transmitting-clock, Fig. 11, is mounted rigidly upon the sleeve carrying the seconds-cam. This is a sixty-tooth wheel, from which some teeth are removed, so that it contains forty-nine teeth, more or less. The first intermission is the twenty-ninth tooth, used merely for an intermediate break during the minute. The next omission of nine teeth, previous to the beginning of each minute, is to mark the beginning of the next minute and afford time for making connections. The wheel G is adjustable, in that it turns with the cam on the seconds-hand arbor, thereby bringing the zero-point always to the beginning of each minute, or it comes back to zero with the cams in order to send out the even minutes—that is, the sixty-seconds point or tooth is always in position to transmit its signal after the secondary control-clock has been controlled.

Circuit-breaking springs B B' and bars B² B³ are secured in a vulcanite block, $w$, and are vertically adjusted in the insulating plate or block R, attached to the plate K of the primary transmitting or secondary control-clock movement by means of set-screws $b$, which pass through the upper ends of the bars B² B³ and into block R. This vertical adjustment is for the purpose of obtaining coincidence of the jewels $h$ on the springs and the teeth on wheel G. Platinum disks $l$ $l'$ are secured to the ends of the bars B² B³ by means of the screws $l^3$. A horizontal adjustment is given to the jewels with the teeth on wheel G by means of the screws $l^3$ by tightening or loosening them. The faces of the teeth are thus permitted to engage with the jewels a greater or less distance, and thus regulate the length of time of contact. The lower ends of the springs have platinum points $i$ normally in contact with the disks $l\,l$. These disks can be rotated on the screws $l^2$, as becomes necessary, and thus insure a perfect contact between points $i$ and disks $l$. A repeater, A, and switch H' complete the transmitting and controlling mechanism.

Figure 10:
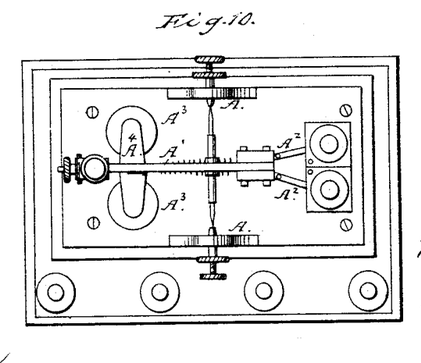
Fig. 10, a plan view of the repeater.

The operation of transmitting the time-signals and controlling clocks is as follows: A few minutes before the signals are to be sent, and the clocks in the circuit set or brought to a zero-point, the beats of both the standard and transmitting clocks are thrown into the chronograph, when the seconds-beats are recorded. Then the pendulum of the transmitting-clock is retarded or accelerated until the difference between the two clocks is equal to the error of the standard, (the sign of said error being noted,) when the transmitting-clock will indicate correct time. At one minute (sooner or later, as may be required) before the clocks in the circuit are to be corrected I close the local circuit 1 by the switch H', Fig. 1, through the seconds-spring B of the transmitting-clock, thence through contact-point $i$, Fig. 6, disk $l$, bar B², to electro-magnet A³, thence to battery, thus actuating arms A' and A², causing contact to be made between spring $p^2$ and point $p^3$ when circuit 1 is broken by wheel G. The contact-spring $p^2$, secured to arm A², causes a prolonged contact to be made between the spring and contact-point $p^3$, and this prolongation insures a positive signal to be made and transmitted. With the ordinary hard contacts between the arm and contact-point $p^3$ the duration is so short that the signal is not detected, and in fact the signal is often not sent; but by means of the spring-contact these defects are remedied. The circuit on main line is then closed by opening switch S³, causing the clock-beats to be transmitted for fifty seconds to all stations on the line to be controlled, except the twenty-ninth second-beat, as indicated by the transmitter, which is left out to mark the half-minute. These seconds-beats are sent over the line as a preparatory signal to the stations and for further comparison of time-pieces not included in the circuit. When the seconds-beats cease to be transmitted after the fiftieth second of the transmitter, (by the omission of the teeth on wheel G,) the switch H' is moved from point $f$ to $f'$, breaking the circuit through the seconds-spring B and closing it through the controlling-spring B'. This last circuit is broken only at the zero-second of the controlling-clock by the projecting-pin H on wheel G, which comes in contact with spring B and pushes it out of contact with disk $l$, breaking the circuit through B. During the omission of the nine teeth the circuit through the local clocks is closed, by means of switch S², by each operator along the line through the clock or clocks of his station. The contact-points $f\,f'$ are placed so close together that the circuit is closed on the second circuit before it is broken on the first, thus preventing the breaking of the local circuit of the transmitter, or of any false signals on the main line until the zero, which last signal sets all the clocks on the line to the time for which they have been adjusted by means of devices similar to those described in connection with the control-clocks. After the final signal has been given, setting all the clocks in circuit, the circuit should be broken through the clocks by opening the switch S², after which the main line should be closed by switch S³, when the circuit through the transmitting-clock may be broken by switch H, without giving any further signal along the line. This leaves the main and other lines in their normal condition for such other business as may be required of them. While I here open and close the circuits by hand-switches, I may also use any of the well-known automatic means for changing currents or making and breaking circuits. I may multiply the number of transmissions of signals over main or other lines by increasing the number of repeating-points, such as shown at A², Fig. 10, or by any other of the well-known means of transmitting and repeating. The main line passing through relay-magnet R² attracts armature R³, thus closing local circuit 2, through contact $t^4$. The switch S² being closed, the circuit is completed. When local circuit 2 is closed the magnet D is energized, and attracts the armature $c$ of lever C, Fig. 5, thus causing the points $e\,e'$ to impinge against the periphery of the cams and return them to their centers. The instant the circuit is broken the armature is released, and the lever, being balanced, returns to its normally-balanced position. As before described, the cam-movement and the dial-train are independent, therefore there is no retardation of either after being brought to the zero-point, as both are acted upon by the clock-movement without interruption. The lever is guided in its movement by the guide $t'$, which also limits its play. The lower projection, I², on bar I (see Fig. 12) strikes a cam, F², and turns the hour-hand, (or this may be done by gearing,) so that I may at once and simultaneously bring back to the zero-point the seconds, minute, and hour hands. Thus the secondary control-clock is controlled in the main line from an observatory or standard controlled time.

Figure 1:
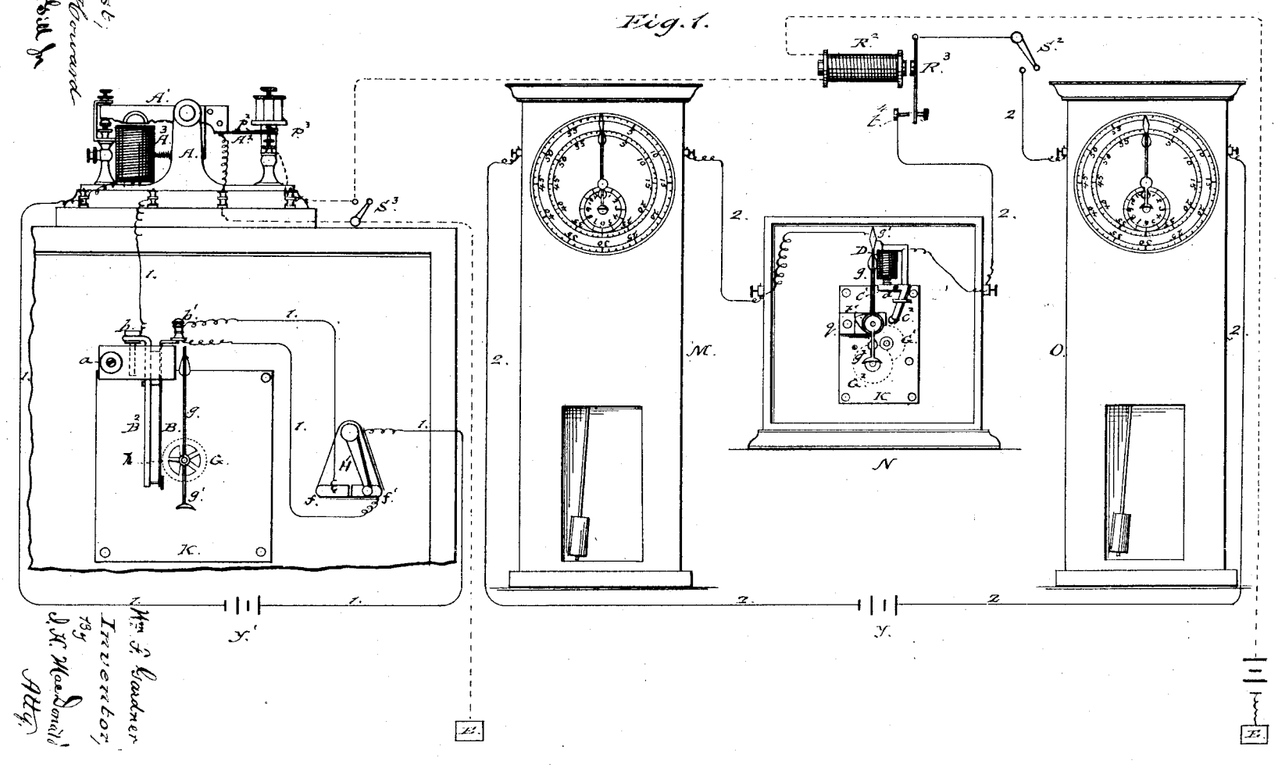
Fig. 1 is an elevation partly in section of the transmitting and controlled clocks embraced in my system of clock-control and time-signaling mechanism.
Figure 1A:
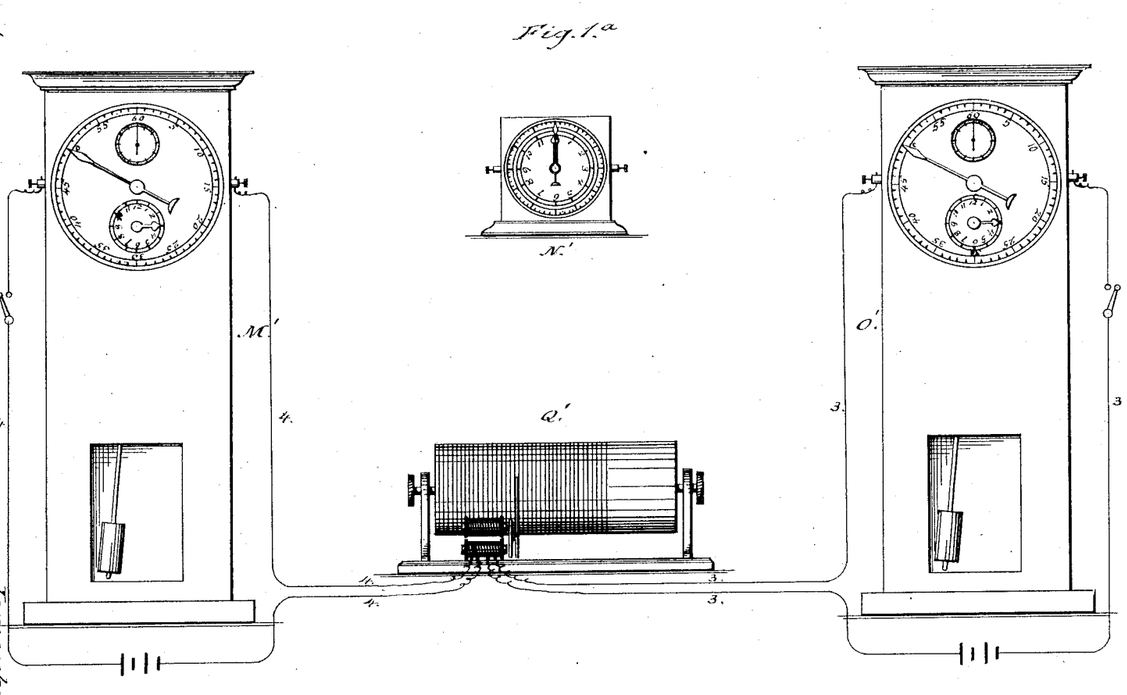
Figures 5, 6:
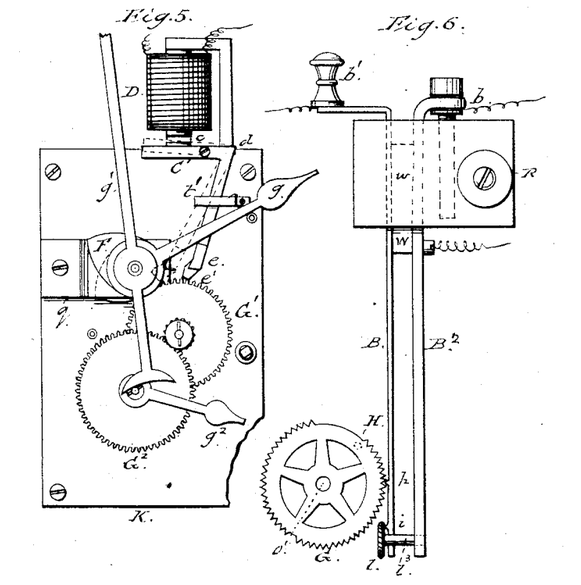
Fig. 5, a side elevation of the dial, train, and cam-actuating mechanism.
Figs. 6 and 7 a side and front view, respectively, of the circuit-breaking springs and wheel for transmitting the primary and controlling signals.
Figure 7:
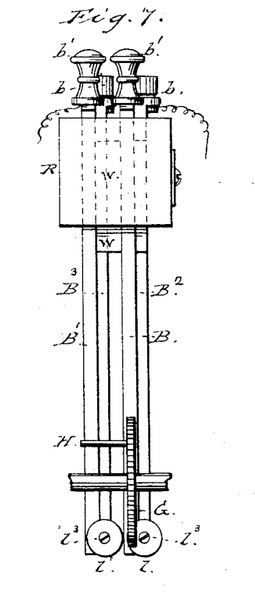
Figure 8:
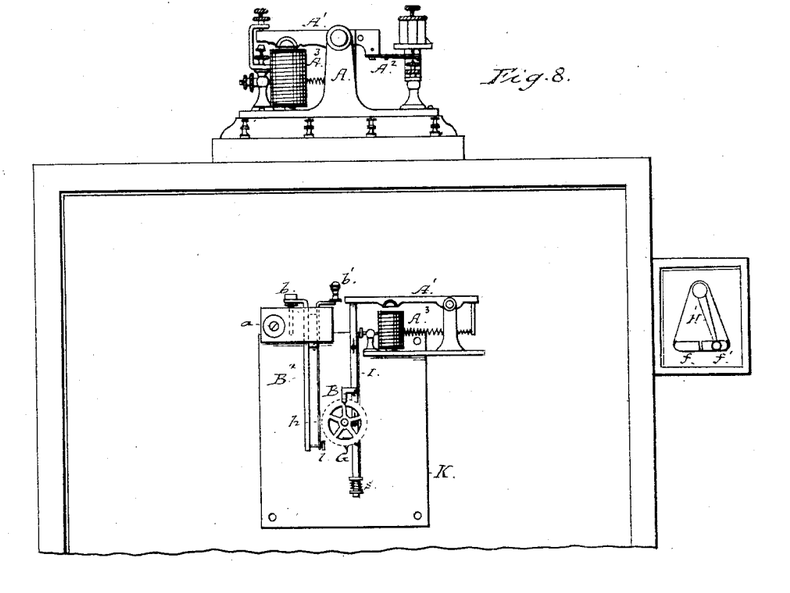
Figs. 8 and 9, side elevations of modifications of the mechanism shown in Fig. 5.
Figure 9:
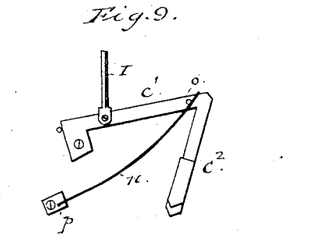

Instead of the armature-lever shown in Figs. 1, 2, and 5, I may cause the armature A' of the electro-magnet, Fig. 11, to push down a vertical bar, I, having projections I' I², which strike and turn the cams vertically and positively, as before described. The bar is secured to the plate K, and guided in its movement by set-screws $z'$, which enter slots $z$ in said bar, and also limit the stroke of the projections I' I on the cams. A spiral spring, S, surrounds the lower end of the bar I, one end of the spring being secured to a shoulder, S', the other to plate S, the spring acting to return the bar to its normal position after the armature has acted.

The bar I may be adjusted vertically, not only by the set-screws $z'$, but by an adjusting-screw, $p^4$, Fig. 11, so that the projections on the bar may be adjusted the proper distance from the cams.

I do not limit myself to the specific method herein described of arranging the circuits, as convenience and economy might make it necessary to use lines or circuits already established and in use for other purposes. This I can do without departing from the spirit of my invention.

This system of controlling clocks has great value and advantages in a railway system, for each road can control its own time from its own control-clock at a central station. Its control-clock being corrected daily, as described, the local clocks can be corrected at night when the wires are comparatively clear. At railway-stations there may be two clocks, one indicating the local time and the other indicating the section time of the railway. At stations such as Baltimore, New York, Boston, Washington, &c., there may be a series of clocks, one of which indicates the local or railway time, and the others the times of other principal cities, thus affording means for comparison of time. It would be preferable for each set of clocks at a depot to have their own local circuit instead of throwing them into the main line. One Leclanché cell will suffice for several clocks for a long period without renewing.

So far as I know there has been no system of clocks devised to control the hour, minute, and seconds hands to an unlimited extent. In systems now in use the control is limited to a certain time, usually zero minutes, of both the controlling and controlled clocks, at which point the control can only be made; and it is also necessary that the extent of error in the subsidiary clock shall not exceed one or two minutes; neither will any of the various systems control two or more clocks and set them to different times by the one signal. In my system any one of the controlled clocks indicating certain time at one place can be taken down, carried to another place and set to its local or other time, without alteration to the clock, it only being necessary to reset the hands and cams. In the system herein described, I control the hour, minute, and seconds hands on any part of the dial, and set the clocks correct to the nearest second. I also set the clocks at any time during the twenty-four hours that may be prearranged, and at each succeeding hour during the twenty-four, as may be desired. Again, I can set any number of clocks to as many different times as there are clocks, and correct any error in each and every one of them.

While I have shown two sets of springs in the controlling-clock, I may use only one set, B', in local lines, where local control only is necessary, as in a single station containing one or more clocks; but in sending to distant stations, I then use the spring B to send out the preparatory signals which precede the control-signals.

The controlled clock N, such as shown in Fig. 1, represents a lever-clock containing the controlled mechanism. Clocks M and O, same figure, are pendulum-clocks, thus showing that I may use either pendulum or lever clocks, or any other time mechanism containing the form of cams contained in the mechanism here shown.

What I claim is—

1. In a clock-controlling system, a standard clock the daily error of which is known, a chronograph for comparing clocks, a transmitting and control clock, a repeater and a series of controlled clocks electrically connected, the control-clock containing means for automatically transmitting preparatory and controlling signals, substantially as and for the purpose described.

2. In a time-controlling system, the method of comparing an independent transmitting with a standard time-piece, and detecting and recording their variation, which consists in connecting said time-pieces with a chronograph, so that the seconds indications are made on the record-sheet simultaneously and in parallel lines, and the difference between the two measured on the barrel of the chronograph by a micrometer-scale, substantially as and for the purpose set forth.

3. The method of transmitting correct time-signals, and automatically setting a system of clocks to such correct time, which consists in comparing an independent transmitting with a standard time-piece, and detecting and recording their variation, by connecting said time-pieces with a chronograph, so that the seconds indications are made on the record-sheet simultaneously and in parallel lines, the correct time thus obtained being transmitted to a series of clocks, and said clocks automatically set to the same or different times by means of a signaling, repeating, and setting mechanism, substantially as set forth.

4. In a clock-controlling system, a standard clock, a chronograph, a control-clock, a repeater, and a series of controlled clocks electrically connected, as described, the controlling-clock containing means for automatically transmitting preparatory signals to the stations containing the controlled clocks, and at the end of said signals setting the hands of the controlled clocks to their local or other determined time, substantially as set forth.

5. In a clock-controlling system, a series of clocks in a main-line circuit, a controlling-clock in a local circuit, a repeater having one or more make or break arms and contacts, said controlling-clock and repeater being adapted to be switched into the main line at the time of sending preparatory signals, and switched out after said signals have been sent, and the clocks set to their local or other times, each of said controlled clocks having a dial-train independent of the setting mechanism.

6. A clock-controlling system containing a transmitting and one or more controlled clocks in electric circuit, the controlled clocks having their hands and one or more cams mounted, as described, the hands being adjusted to local or other time, and the cams so centered that the push-points of the cam-lever will bear on their respective centers at the same time, whereby through the intervention of a magnet and armature in electric circuit with the clocks, said controlled clocks may be automatically set to the same or as many different times as there are clocks, substantially as and for the purpose set forth.

7. A clock-controlling system, in which two or more controlled clocks in the same electric circuit can be automatically and simultaneously set to different times by one signal from the transmitting-clock, said controlled clocks having each a dial-train independent of the setting mechanism, substantially as described, and for the purpose set forth.

8. A clock-controlling system, as described, in which the hour, minute, and seconds hands are controlled on any part of the dial, the error being corrected and each clock set to the same or a different time at the same instant, substantially as set forth.

9. In a clock-controlling system, as described, a transmitting-clock provided with a dial-train, one or more cams mounted as described, a circuit-breaking wheel, G, on the seconds-hand arbor, one or more circuit-breaking springs and spring-bars, said springs being each provided with a jewel to engage with the teeth on said wheel, and a contact-point engaging with a disk attached to the spring-bars, a lever for actuating the cams, a magnet-armature to actuate said lever, the magnet and springs being in circuit with a standard clock and a repeater, A, substantially as and for the purpose set forth.

10. A time mechanism in which the hour, minute, and seconds hands are simultaneously set or brought to a zero-point from any position on the dial by two or more cams suitably connected to said hands, said cams being controlled by a current of electricity through the intervention of suitable mechanism, substantially as and for the purpose set forth.

11. In a clock-controlling system, as described, a controlled clock having a dial-train independent of the hands-setting mechanism, one or more cams, F F, mounted as described, a cam-actuating lever, and a magnet for actuating the cam-lever, said magnet being in circuit with a signal-transmitting clock, substantially as set forth.

12. In a transmitting-clock, for the purpose herein described, a circuit-breaking wheel, G, mounted on the sleeve carrying the seconds-hand and having one or more teeth removed from one part of its periphery for an intermediate break during the minute, and nine teeth (more or less) removed previous to the beginning of the next minute, whereby time is afforded for making proper circuit-connections, substantially as and for the purpose set forth.

13. In a signal-transmitting clock, for the purpose described, the circuit-breaking springs B B', insulated from each other and provided with jewels $h$ and contacts $i$, said springs having a vertical and horizontal adjustment, as and for the purpose set forth.

14. The springs B B' and bars $B^2$ $B^3$, provided with the adjusting-screws $b$ and $b^3$ and disks $l$, as and for the purpose set forth.

15. In a signal-transmitting clock, as described, the combination, with the springs B B', having the contacts $h$ $i$, of the bars $B^2$ $B^3$, having the disks $l$, said springs and bars having a vertical adjustment, as and for the purpose set forth.

16. In a transmitting-clock, as described, the combination, with the springs B B' and bars $B^2$ $B^3$, of the wheel G, as and for the purpose set forth.

17. In a transmitting-clock, as described, the combination of the springs B B', bars $B^2$ $B^3$, and wheel G, with the repeater A, as and for the purpose set forth.

18. The combination, with the dial-train, cams mounted as described, circuit-breaking spring, magnet, and armature, of the adjustable cam-actuating bar I, provided with the projections $I'$ $I^2$ $I^3$, by means of which the cams are acted upon vertically and positively, substantially as and for the purpose set forth.

In testimony whereof I affix my signature in presence of two witnesses.

WILLIAM F. GARDNER.

Witnesses:
I. H. McDONALD,
W. J. NEWTON.